United States Patent
Kim (10) Patent No.: US 6,211,855 B1
(45) Date of Patent: Apr. 3, 2001

(54) TECHNIQUE FOR CONTROLLING SCREEN SIZE OF MONITOR ADAPTED TO GUI ENVIRONMENT

(75) Inventor: Sung-Je Kim, Suwon (KR)

(73) Assignee: Samsung Electronics Co, Ltd., Suwon (KR)

( * ) Notice: Subject to any disclaimer, the term of this patent is extended or adjusted under 35 U.S.C. 154(b) by 0 days.

(21) Appl. No.: 08/917,842

(22) Filed: Aug. 27, 1997

(30) Foreign Application Priority Data

Aug. 27, 1996 (KR) .................................. 96-35855

(51) Int. Cl.[7] ....................................... G09G 5/00
(52) U.S. Cl. ...................... 345/127; 345/131; 345/132; 348/358; 348/561
(58) Field of Search .................................. 345/127, 131, 345/132, 12, 13; 348/358, 561, 562, 704

(56) References Cited

U.S. PATENT DOCUMENTS

| | | | |
|---|---|---|---|
| 3,723,804 | * 3/1973 | Yasumatsuya | 315/276 D |
| 3,989,888 | * 11/1976 | Busch et al. | 348/597 |
| 4,282,550 | * 8/1981 | Coviello | 358/160 |
| 4,547,708 | * 10/1985 | Haferl | 315/371 |
| 4,683,469 | * 7/1987 | Elsmore et al. | 340/723 |
| 4,991,022 | * 2/1991 | Canfield et al. | 358/180 |
| 5,021,719 | * 6/1991 | Arai et al. | 315/354 |
| 5,060,135 | * 10/1991 | Levine et al. | 364/200 |
| 5,155,417 | * 10/1992 | Tateishi | 315/371 |
| 5,187,776 | * 2/1993 | Yanker | 395/157 |
| 5,227,771 | * 7/1993 | Kerr et al. | 345/340 |
| 5,341,466 | * 8/1994 | Perlin et al. | 395/139 |
| 5,436,669 | * 7/1995 | Baba et al. | 348/556 |
| 5,471,563 | * 11/1995 | Dennis et al. | 395/114 |
| 5,528,740 | * 6/1996 | Hill et al. | 395/128 |
| 5,568,273 | * 10/1996 | Sato et al. | 358/451 |
| 5,579,025 | * 11/1996 | Itoh | 345/3 |
| 5,602,567 | * 2/1997 | Kanno | 345/132 |
| 5,612,715 | * 3/1997 | Karaki et al. | 345/132 |
| 5,661,824 | * 8/1997 | Allebach et al. | 382/298 |
| 5,666,160 | * 9/1997 | Hwang | 340/240 |
| 5,666,475 | * 9/1997 | Salesin et al. | 345/428 |
| 5,680,152 | * 10/1997 | Bricklin | 345/119 |
| 5,686,969 | * 11/1997 | Baik | 348/556 |
| 5,696,530 | * 12/1997 | Maejima | 345/127 |
| 5,703,444 | * 12/1997 | Teuling et al. | 325/371 |
| 5,713,040 | * 1/1998 | Lee | 395/800 |
| 5,736,971 | * 4/1998 | Shirai | 345/127 |
| 5,748,259 | * 5/1998 | Kang | 348/634 |
| 5,801,767 | * 9/1998 | Wu | 348/190 |
| 5,808,589 | * 9/1998 | Fergason | 345/8 |
| 5,812,111 | * 9/1998 | Fuji et al. | 345/131 |

(List continued on next page.)

*Primary Examiner*—William A. Cuchlinski, Jr.
*Assistant Examiner*—Marthe Y. Marc-Coleman
(74) *Attorney, Agent, or Firm*—Robert E. Bushnell, Esq.

(57) ABSTRACT

A circuit for controlling a partial magnification of a monitor screen, includes: a microcomputer having a program for controlling the size of the monitor screen which receives the horizontal and vertical synchronization signals H-SYNC and V-SYNC and generates horizontal and vertical control signals by using those synchronization signals, and thus controlling the magnification of the monitor screen; a horizontal and vertical signal processor for receiving a voltage control signal according to a vertical size magnification of the monitor screen output from the microcomputer, and outputting a control voltage according to the voltage control signal; an S-shaped correcting and switching circuit for receiving an S-shaped correcting signal and a switching control signal output from the microcomputer, and for controlling the horizontal size of the screen; and a vertical deflection IC for receiving the control voltage according to the voltage control signal for magnifying the vertical size of the monitor screen output from the horizontal and vertical signal processor, and for transferring the sawtooth wave current to a vertical deflection yoke circuit with the supplied voltage control signal.

8 Claims, 9 Drawing Sheets

U.S. PATENT DOCUMENTS

| | | | |
|---|---|---|---|
| 5,828,418 | * 10/1998 | Lee | 348/556 |
| 5,831,398 | * 11/1998 | Kim | 315/371 |
| 5,838,296 | * 11/1998 | Butler et al. | 345/127 |
| 5,838,370 | * 11/1998 | Kaji | 348/240 |
| 5,838,371 | * 11/1998 | Hirose et al. | 348/240 |
| 5,841,418 | * 11/1998 | Bril et al. | 345/3 |

* cited by examiner

TECHNIQUE FOR CONTROLLING SCREEN SIZE OF MONITOR ADAPTED TO GUI ENVIRONMENT

CLAIM OF PRIORITY

This application makes reference to, incorporates the same herein, and claims all benefits accruing under 35 U.S.C. §119 from an application for CIRCUIT AND METHOD OF CONTROLLING SCREEN SIZE OF MONITOR ADAPTED TO GUI ENVIRONMENT earlier filed in the Korean Industrial Property Office on the 27$^{th}$ of August 1996 and there duly assigned Serial No. 35855/1996.

BACKGROUND OF THE INVENTION

1. Field of the Invention

The present invention relates to a technique for controlling the screen size of a monitor adapted for the environment of a graphic user interface (hereinafter, referred to as a "GUI") between a computer and a user and, more particularly, to a technique for controlling the screen size of a monitor adapted for the GUI environment which is contrived to magnify a part of the screen by using an S-shaped correcting an switching circuit and a correcting port of a horizontal and vertical signal processor in the monitor.

2. Discussion of Related Art

In general human beings can sense graphic data, that is, visual information more rapidly than any other sort of information. For that reason, it may be good if software is visible as other visible objects. A dialogic button controller of Windows utilizing this principle converts conceptual data into visible data. Therefore, data are easily shown when those windows are used, and moreover lots of data can be seen by overlapping the screens. Software utilizing windows is designed to select command words logically by operating the button controller on the monitor screen.

For these reasons, as hardware and software have gradually gotten more complicated and their operating method gets more difficult, a GUI (graphical user interface) operational system has been developed. The GUI operational system provides a computer operation with continuity and convenience as well as simplicity of study.

Those applied programs utilizing the GUI environment can execute more than one program at a time. The applied programs are utilized by dividing CPU time in order. But, this means dividing the time of CPU use, and not simultaneously executing those applied programs. This is because the user cannot sense the speedy conversion of the applied programs by the CPU. The ability to simultaneously perform various functions is called multitasking. An environment for executing the multitasking is called a GUI environment, and is widely distributed recently.

But, a monitor adaptable to the GUI environment has not been developed yet.

In an earlier monitor for multitasking, the video card receives data processed in a central processing unit of a computer and processes the data into video signals including horizontal and vertical synchronization signals and RGB (red, green and blue) video signals.

The RGB signals are fed to a video preamplifier which in turn is fed to a video output amplifier which in turn feeds a cathode ray tube.

The horizontal and vertical synchronizing signals are fed to a microcomputer as well as to a horizontal and vertical oscillator signal processor. The horizontal and vertical oscillator signal processor provides an output to a horizontal driving circuit which in turn drives a horizontal output circuit driving a horizontal deflection yoke. The horizontal and vertical oscillator processor also provides an output to a vertical output circuit which drives a vertical deflection yoke. An automatic frequency control circuit provides control signals both to the horizontal and vertical oscillator signal processor and the horizontal output circuit.

An S correcting circuit receives an S-shaped correction signal from the microcomputer and supplies the S-shaped correction signals to the horizontal output circuit to correct the distortion of the monitor screen.

In such a monitor, during multitasking in the GUI environment, various programs are executed at the same time by using multiple windows. However, the monitor does not provide a circuit which magnifies a certain portion of on the monitor screen using hardware.

SUMMARY OF THE INVENTION

Accordingly, the present invention is directed to a monitor size controlling circuit adapted to a GUI environment that substantially obviates one or more of the problems due to the limitations and disadvantages of the related art.

An object of the present invention is to provide a circuit for magnifying a certain portion of the full screen by using an S-shaped correcting and switching circuit and a vertical deflection IC to thereby provide a monitor usefully utilized in the GUI environment.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the invention includes a horizontal and vertical signal processor for receiving horizontal and vertical control signals output from the microcomputer and for outputting correcting signals to horizontal and vertical circuits; a horizontal driving circuit for supplying sufficient current; a horizontal deflection yoke circuit for generating a sawtooth wave current and for synchronizing video signals displayed on a monitor screen with the generated sawtooth wave current; an S-shaped correcting and switching circuit for controlling the horizontal size of the screen; a vertical deflection IC for amplifying the deflection current; and a vertical deflection yoke circuit for synchronizing the video signals with the sawtooth wave current.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
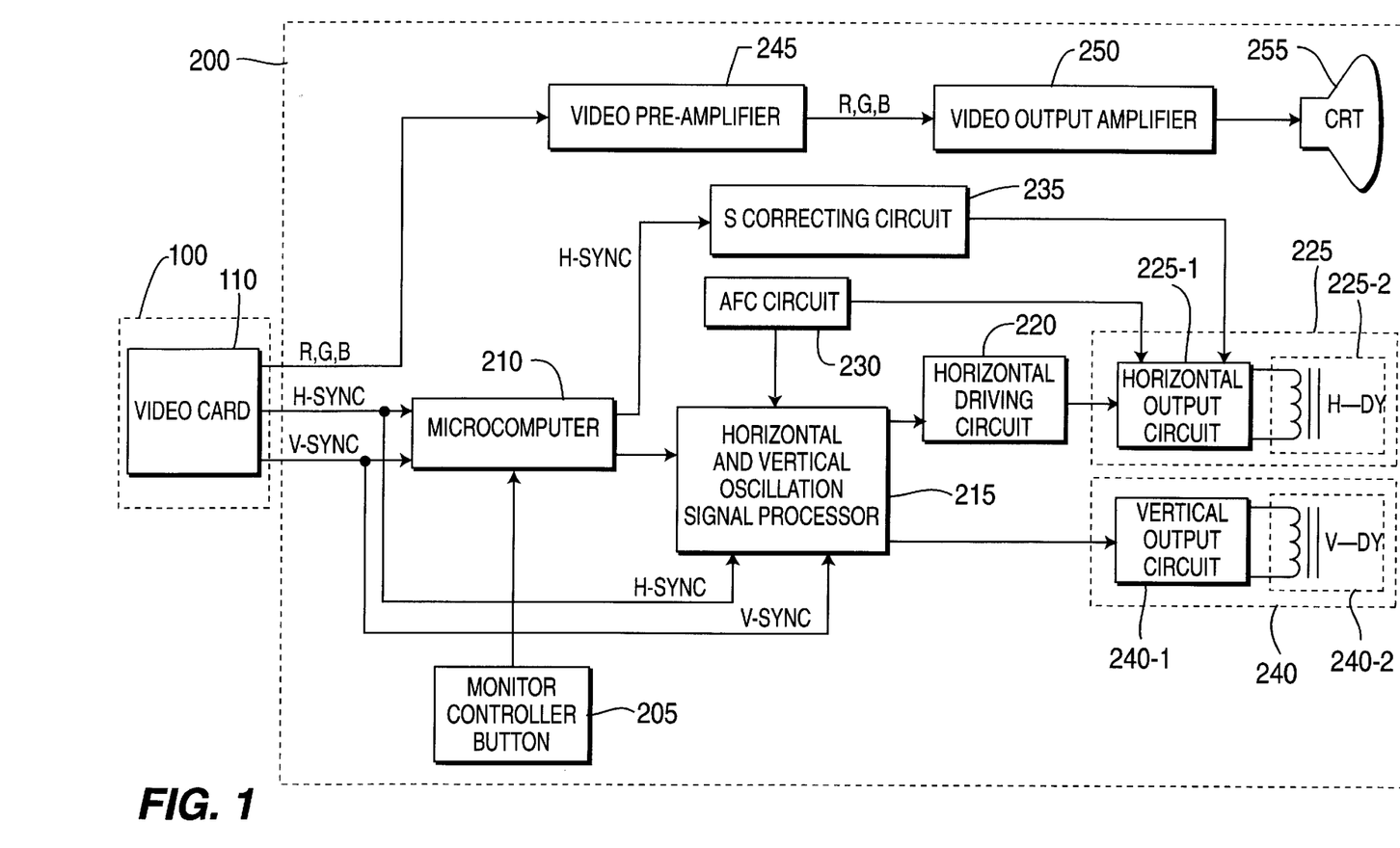
FIG. 1 is a block diagram illustrating a horizontal and vertical circuit in a monitor.

FIG. 1 is a block diagram illustrating horizontal and vertical circuits in a monitor. The circuit includes a video card 110 for receiving data processed in a CPU (not shown) in PC 100, processing the data into video signals and then outputting a horizontal synchronization signal H-SYNC, a vertical synchronization signal V-SYNC and R. G. B. video signals; a monitor button controller 205 for outputting a monitor control signal for controlling each circuit of a monitor 200; a microcomputer 210 for receiving a monitor control signal output from the monitor button controller 205 and the horizontal synchronization signal H-SYNC and the vertical synchronization signal V-SYNC, and for outputting a control signal for controlling the monitor screen and a reference oscillator signal; a horizontal and vertical oscillator signal processor 215 for receiving a reference oscillating signal output from the microcomputer 210, and the horizontal and vertical synchronization signals H-SYNC and V-SYNC output from the video card 110 to correct their linearity and compensate for their frequency band; a horizontal driving circuit 220 for receiving a horizontal oscillator signal output from the horizontal and vertical oscillator signal processor 215 and for amplifying the horizontal oscillator signal output for supplying the sufficient current; a horizontal deflection yoke circuit 225 for receiving a horizontal driving signal output from the horizontal driving circuit 220 and for outputting a horizontal sawtooth wave to synchronize a video signal displayed on the monitor; an automatic frequency control (AFC) circuit 230 for detecting a phase difference between the oscillator pulse output from the horizontal and vertical oscillator signal processor 215 and the horizontal synchronization pulse output from the horizontal deflection yoke circuit 225 and for controlling the oscillator frequency according to the detected phase difference; an S-shaped correcting circuit 235 for receiving an S-shaped correction signal from the microcomputer 210 and for supplying the S-shaped correction signal to the horizontal deflection yoke circuit 225 to correct the distortion of the monitor screen; a vertical deflection yoke circuit 240 for making a vertical deflection IC (not shown) amplify the vertical sawtooth wave current output from the horizontal and vertical oscillator signal processor 215, and for synchronizng the video signal displayed on the screen according to the amplified sawtooth wave current; a video preamplifier 245 for receiving the R. G. B. video signals output from the video card 110 and for amplifying them up to a predetermined level; a video output amplifier 250 for &ay amplifying the R. G. B. video signals output from the video preamplifier 245; and a cathode ray tube (CRT) 255 for receiving and displaying the video signals output from the video output amplifier 250.

The horizontal deflection yoke circuit 225 includes a horizontal output circuit 225-1 for receiving the horizontal driving signal output from the horizontal driving circuit 220 and for generating sawtooth wave current; and a horizontal deflection yoke H-DY 225-2 for receiving the sawtooth wave current output from the horizontal output circuit 225-1 and for synchronizing the R. G. B. video signals displayed on the monitor screen.

The vertical deflection yoke circuit 240 includes a vertical deflection output circuit 240-1 for amplifying the sawtooth wave current output from the horizontal and vertical oscillator signal processor 215; and a vertical deflection yoke V-DY 240-2 for receiving the sawtooth wave current output from the vertical output circuit 240-1 and for vertically synchronizing the R. G. B. video signals displayed on the monitor screen.

The video card 110 for receiving data processed in the CPU in PC 100 processes the data input into video signals. The video card 110 outputs the horizontal and vertical synchronization signals H-SYNC and V-SYNC for synchronizing the R. G. B. video signals. Here, if a user utilizes the monitor button controller 205 to control the monitor screen of the monitor 200, the monitor button controller 205 outputs a monitor control signal.

The microcomputer 210, which receives the monitor control signal output from the monitor button controller 205, and the horizontal and vertical synchronization signals H-SYNC and V-SYNC output from the video card 110, outputs the control signal of the monitor screen. The horizontal and vertical oscillator signal processor 215 receiving the control signal from the microcomputer 210 receives the horizontal and vertical synchronization signals H-SYNC and V-SYNC from the video card 110.

The horizontal and vertical oscillator signal processor 215 receiving the synchronization signals H-SYNC and V-SYNC from the video card 110 corrects the frequency band of those signals and their linearity. The horizontal oscillator signal output from the horizontal and vertical oscillator signal processor 215 is supplied to the horizontal driving circuit 220. The horizontal driving circuit 220 supplies sufficient current to the output signal 225-1 in the horizontal deflection yoke circuit 225. The horizontal output circuit 225-1 receiving sufficient current transmits the sawtooth wave current across the horizontal deflection yoke H-DY 225-2. The horizontal deflection yoke H-DY 225-2 synchronizes the R. G. B. video signals.

The AFC circuit 230 detects the phase difference between the oscillator pulse output from the horizontal and vertical oscillator signal processor 215 and the horizontal synchronization pulse generated in the horizontal deflection yoke circuit 225 and controls the oscillating frequency according to the detected phase difference.

If data associated with the S-shaped correcting signal previously stored in the microcomputer 210 are output, the data are supplied to the S-shaped correcting circuit 235, and the circuit 235 controls the horizontal output circuit 225-1 and corrects the deflection distortion in which both sides are larger than the center of the CRT 255.

Meanwhile, the vertical output circuit 240-1 in the vertical deflection yoke circuit 240 receives the vertical oscillator signal output of the horizontal and vertical oscillator signal processor 215 and generates the vertical sawtooth wave current to the vertical deflection yoke V-DY 240-2. The vertical sawtooth wave current synchronizes the R. G. B. video signals displayed on the CRT 255.

The R. G. B. video signs output from the video card 110 are amplified up to a predetermined level in the video pre-amplifier 245. The amplified R. G. B. signals are finally amplified in the video output amplifier 250 and transmitted to the CRT 255. The CRT 255 displays the R G. B. video signals. The R G. B. video signals are synchronized by the sawtooth wave current generated in the horizontal and vertical deflection yokes H-DY 225-2 and V-DY 240-2.

Figure 2:
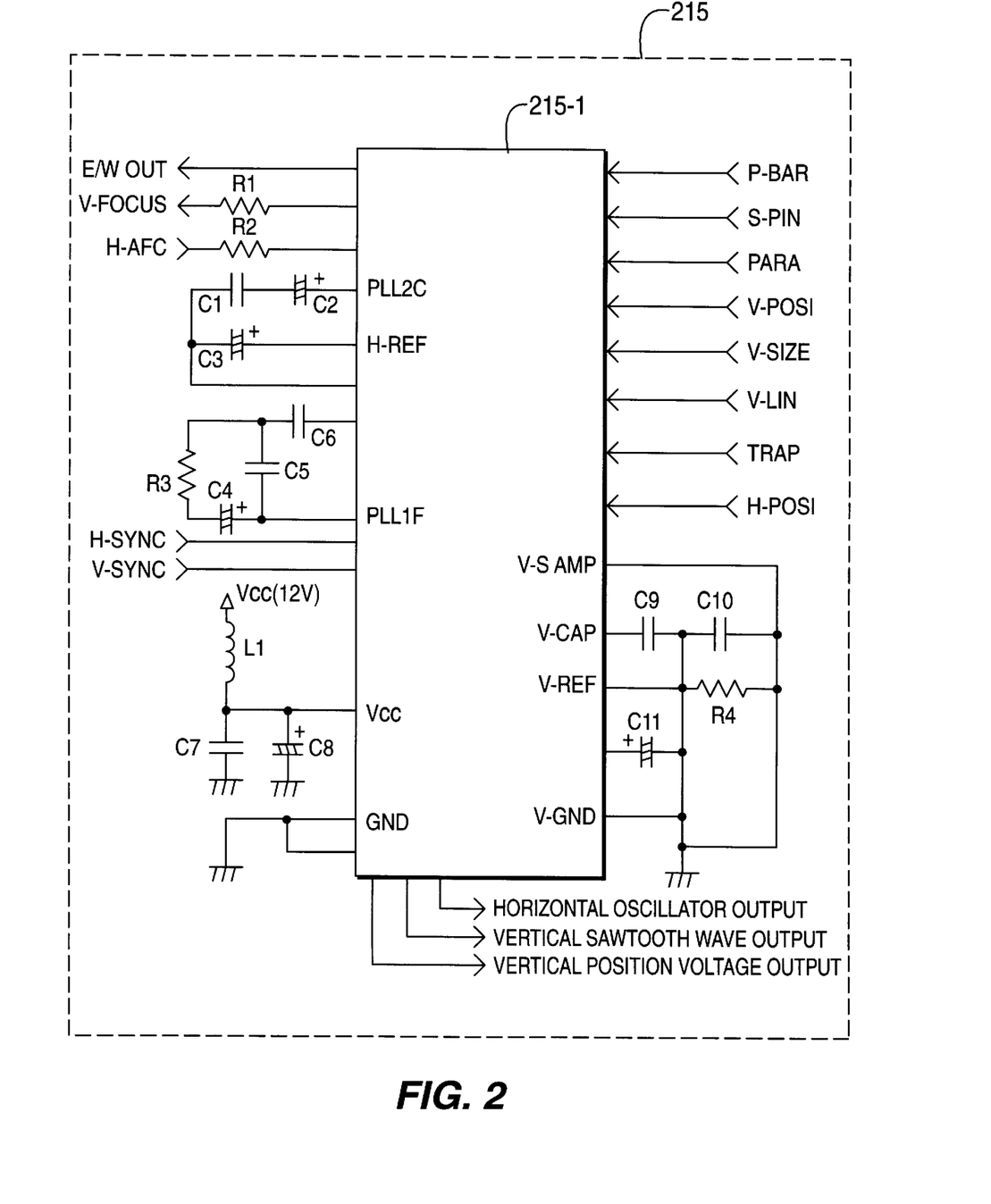
FIG. 2 is a detailed circuit diagram illustrating a horizontal and vertical signal processor of FIG. 1.

As illustrated in FIG. 2, the horizontal and vertical signal processor 215 includes a horizontal and vertical signal processor IC 215-1, resistors R1 to R4, and capacitors C1 to C11. The horizontal and vertical signal processor IC 215-1 receives a pin balance signal S-PIN, a parabola signal PARA, a vertical position signal V-POSI, a vertical size signal V-SIZE, a vertical linearity correction signal V-LIN, a trapezoid signal TRAP, a horizontal position signal H-POSI each output from the microcomputer 210 (see FIG. 1), the horizontal and vertical synchronization signals H-SYNC and V-SYNC output from the video card 110 (see FIG. 1), and the horizontal automatic frequency control signal H-AFC output from the horizontal output circuit 225-1, and outputs a vertical focus signal V-FOCUS according to each control signal input, the corrected vertical sawtooth wave current, a vertical position control voltage signal a corrected horizontal parabola signal and a horizontal oscillator signal.

The microcomputer 210 receives the horizontal and vertical synchronization signals H-SYNC and V-SYNC output from the video card 110. The microcomputer 210 generates a horizontal and vertical synchronization position signals by using the horizontal and vertical synchronization signals H-SYNC and V-SYNC. The microcomputer 210 outputs a vertical focus signal V-FOCUS, the corrected vertical sawtooth wave current, a vertical position control voltage signal a corrected horizontal parabola signal and a horizontal oscillator signal, using the monitor control signal data pre-stored in a read only memory (ROM) (not shown). The processor 215 is driven by eliminating the fine alternating current noise output from a coil L1, smoothing it through the capacitors C7 and C8, and receiving the driving voltage Vcc 12V of the horizontal and vertical signal processor IC 215-1.

Capacitors C1 to C3 set an oscillating frequency band of a free-running frequency of a first phase-locked loop (PLL) signal PLL2C. The resistor R3 and capacitors C5 and C6 filter the second PLL signal PLL1F. The capacitors C9 to C11 and the resistor R4 generate the S-shaped correction gain signal V-S AMP, a capacitor capacitance signal V-CAP and a reference vertical oscillator signal V-REF, and output them to the horizontal and vertical signal processor IC 215-1.

The horizontal and vertical signal processor IC 215-1 receiving the pin balance signal S-PIN, the parabola signal PARA, the vertical position signal V-POSI, the vertical size signal V-SIZE, the vertical linearity correction signal V-LIN, the trapezoid signal TRAP, the horizontal position signal H-POSI each output from the microcomputer 210, outputs the corrected vertical sawtooth wave current, the vertical position control voltage signal, the corrected horizontal parabola signal and the horizontal oscillator signal.

Figure 3:
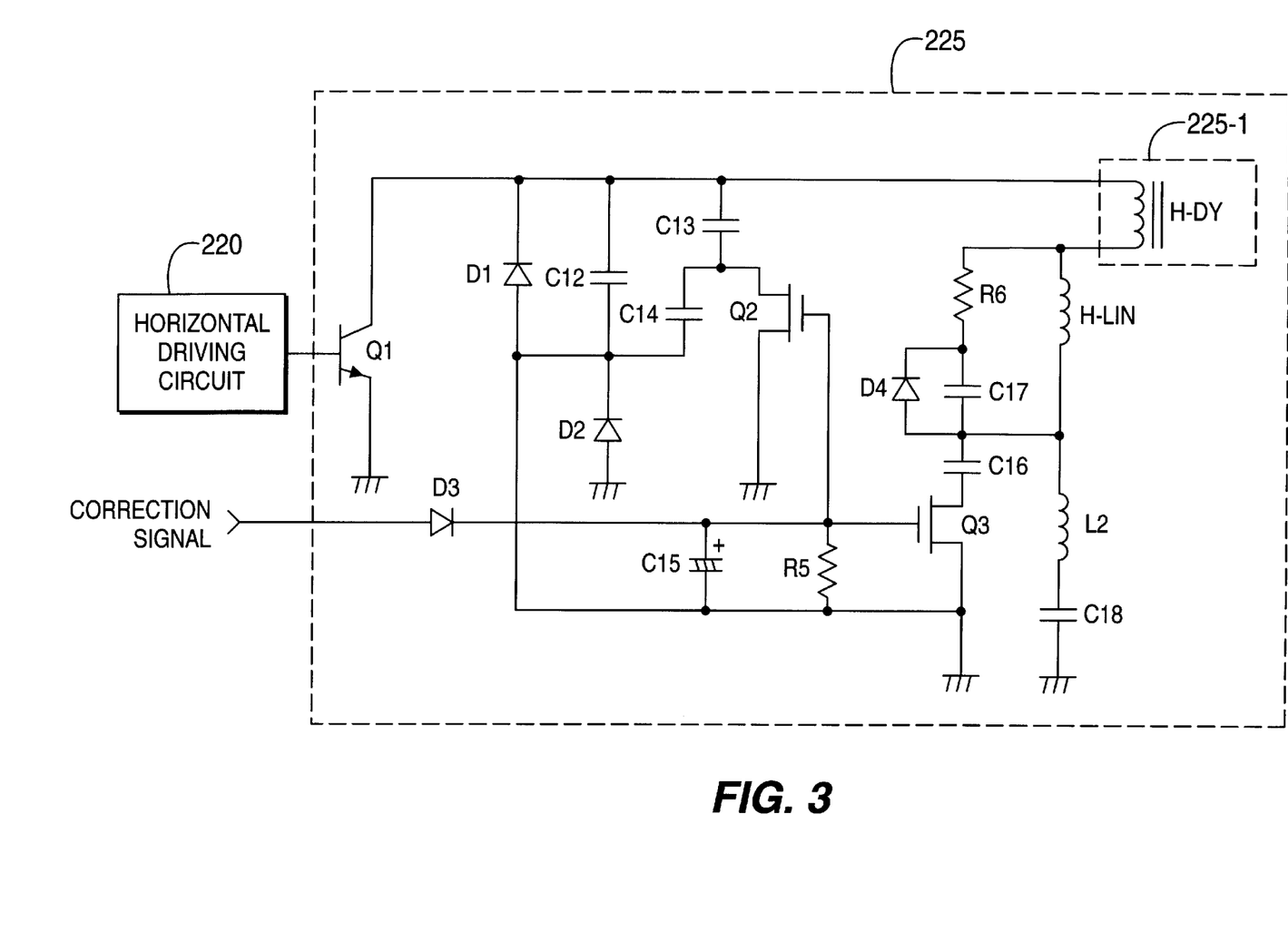
FIG. 3 is a detailed circuit diagram illustrating a horizontal deflection yoke circuit of FIG. 1.

The horizontal deflection yoke circuit 225 receiving the horizontal oscillation signal output from the horizontal and vertical signal processor 215 will be described below with reference to FIG.3.

The horizontal deflection yoke 225 includes a horizontal driving circuit 220 for receiving the horizontal oscillator signal output from the horizontal and vertical signal processor 215 and for supplying sufficient horizontal current; and a horizontal deflection yoke 225 for receiving the sufficient current and horizontally synchronizing the video signal displayed on the monitor screen. The horizontal deflection yoke circuit 225 includes a horizontal deflection yoke H-DY 225-1 for receiving the sawtooth wave current and for synchronizing the video signals displayed on the monitor screen; a horizontal linearity coil H-LIN for correcting its linearity; transistors Q, to Q3, resistors R5 and R6, capacitors C12 to C18, diodes D1 to D3, and a coil L2.

The horizontal current signal output from the horizontal drive circuit 220 is supplied to a base of the transistor Q1 in the horizontal deflection yoke circuit 225. The transistor Q1 starts switching, so that the sawtooth wave current is generated in the horizontal deflection yoke H-DY 225-1 through the charging/discharging of the capacitor C12. Moreover, a voltage with a large pulse is generated in a collector by the resonance of the horizontal deflection yoke H-DY 225-1 and the parallel capacitors C12 and C13, and according the sawtooth wave current flows across the horizontal deflection yoke H-DY 225-1.

The positive sawtooth wave current is supplied to the transistor Q1 and the negative sawtooth wave current is supplied to the diodes D1 and D2. By the thus-generated sawtooth wave current in the horizontal deflection yoke D-DY 225-1, the video signal on the monitor screen is horizontally synchronized.

If the correction signal for correcting the distortion of the image displayed on the monitor is it supplied to the base ofthe field effect transistor (FET) Q3 through the diode D3, the capacitor C15 and the resistor R5 smooth the supplied correction signal. The FET Q3 receiving the correction signal starts to switch to be connected to the capacitors C16 and C17, thereby performing an S correction. By the resistor R6, capacitors C16 and C17, and the horizontal linearity correcting coil H-LIN, the linearity of the monitor screen is corrected. Here, the diode D4 is used for a protection of the transistor Q3.

Furthermore, the correction signal is supplied to the base of the FET Q3 through the diode D3 and simultaneously to the base of the FET Q2. If the correction signal is supplied to the base of FET Q2, it is fed back through the capacitor C14 and corrects the distortion of the image on the monitor by the horizontal linearity correcting coil H-LIN.

Figure 4:
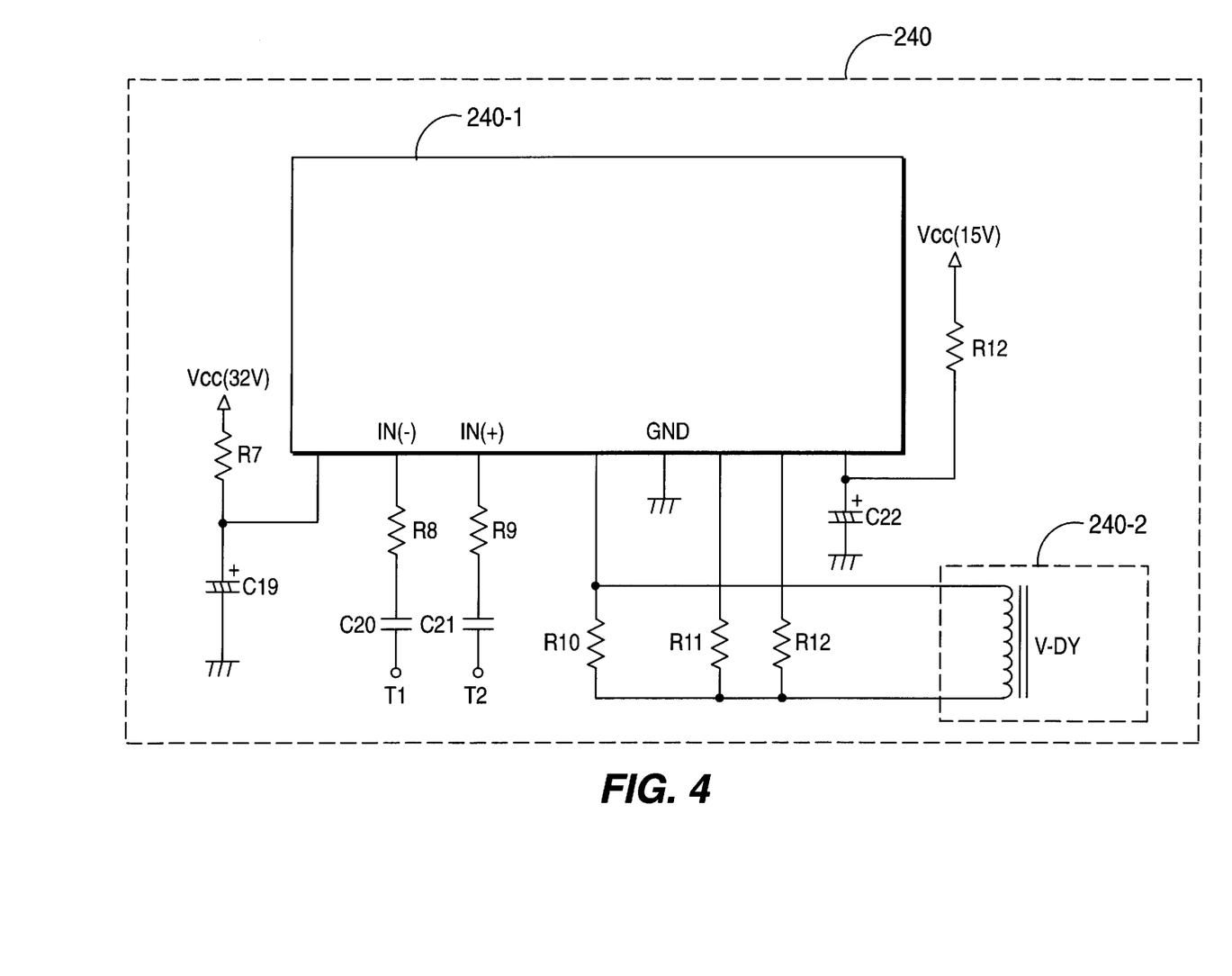
FIG. 4 is a detailed circuit diagram illustrating a vertical deflection yoke circuit of FIG. 1.

With reference to the attached drawing, there will be described below a vertical deflection yoke circuit 240 which operates to shift to the next line of the monitor screen while the video signal of the monitor screen in the horizontal deflection yoke circuit 225 or raster is synchronized.

FIG. 4 is a detailed circuit diagram of the vertical deflection yoke circuit of FIG. 1, including a vertical deflection IC 240-1 for receiving a vertical oscillator signal output from the horizontal and vertical signal processor 215 (see FIG. 1) and for generating sufficient current; a vertical deflection yoke V-DY 240-2 for receiving the current signal output from the vertical deflection IC 240-1 and for generating a sawtooth wave current; resistors R7 to R13; and capacitors C19 and C22. Their operations will be described below.

The vertical deflection yoke circuit receives the vertical oscillator signal output from the horizontal and vertical signal processor 215, series current Vcc 32V supplied through the resistor R7 and the capacitor C19, and another series current Vcc 15V through the resistor R8 and the capacitor C22. A negative signal is input through the port T1, the resistor R8 and the capacitor C20. A positive signal is input through the port T2, the resistor R9 and the capacitor C21. The vertical deflection IC 240-1 receiving those signals supplies the sawtooth wave current to the horizontal deflection yoke V-DY through the resistors R10, R11 and R12. The vertical deflection yoke V-DY 240-2 receiving the sawtooth wave current synchronizes the vertical raster on the monitor screen.

Is In such a monitor, during multitasking in the GUI environment, various programs are executed at the same time by using multiple windows, but the monitor does not provide a circuit which magnifies a certain portion on the monitor screen using hardware.

Reference will now be made in detail to the preferred embodiments of the present invention, examples of which are illustrated in the accompanying drawings.

Figure 5:
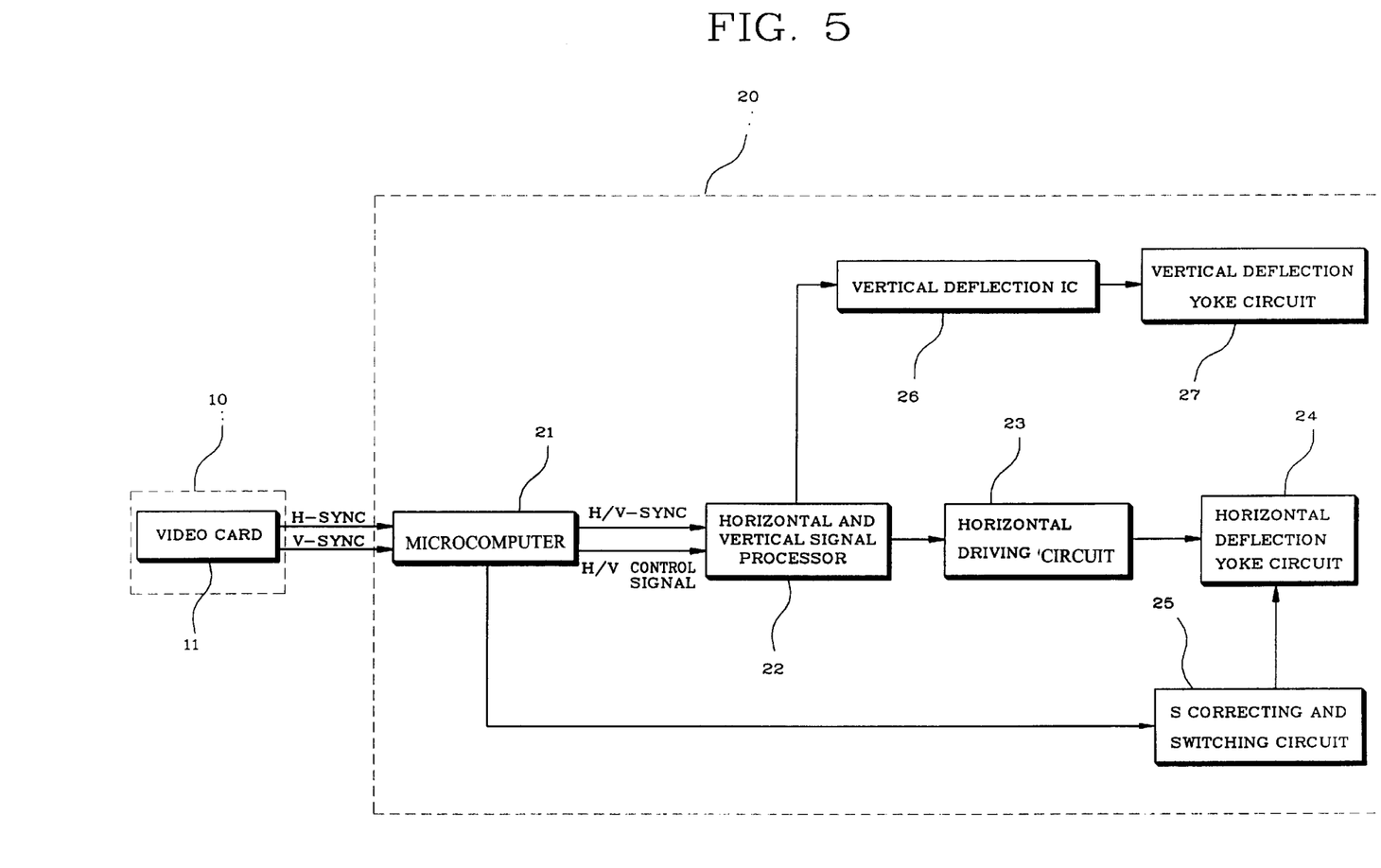
FIG. 5 is a block diagram illustrating a screen size controlling circuit of the invention.

As illustrated in FIG. 5, a screen size controlling circuit of the invention includes: a video card 11 for processing data of a PC 10 into video signals and for generating horizontal and vertical synchronization signals H-SYNC and V-SYNC to synchronize the processed video signals; a microcomputer 21, mounted in a monitor 20 and having a magnification control program, which receives the horizontal and vertical synchronization signals H-SYNC and V-SYNC and generates horizontal and vertical control signals by using those synchronization signals, thus controlling the magnification of the monitor screen; a horizontal and vertical signal processor 22 for receiving the horizontal and vertical control signals output from the microcomputer 21 and a vertical voltage control signal, and for outputting correction signals to horizontal and vertical circuits; a horizontal driving circuit 23 for receiving the horizontal correction signal output from the horizontal and vertical signal processor 22, and for supplying sufficient current; a horizontal deflection yoke circuit 24 for receiving the horizontal current signal, generating sawtooth wave current, and for synchronizing R. G. B. video signals displayed on the monitor screen according to the sawtooth wave current; an S-shaped correcting and switching circuit 25 for receiving an S-shaped correcting signal and a switching signal output from the microcomputer 21, and for controlling the horizontal size of the screen; a vertical deflection IC 26 for receiving the vertical control signal and for controlling the screen size; and a vertical deflection yoke circuit 27 for receiving the vertical current output from the vertical deflection IC 26, and for generating the sawtooth wave current and synchronizing the R. G. B. video signals with the sawtooth wave current.

An operation of such a screen size controlling circuit of the invention is described below.

The video card 11 for processing data of PC 10 into R. G. B. video signals outputs the horizontal and vertical synchronization signals H-SYNC and V-SYNC to synchronize those R. G. B. video signals. The video signals are amplified through a video output amplifier and displayed on the monitor screen 20. The horizontal and vertical synchronization signals H-SYNC and V-SYNC are output to the microcomputer 21. The microcomputer 21 receiving those synchronization signals outputs horizontal and vertical control signals according to the horizontal and vertical control data previously stored in the microcomputer 21. The horizontal and vertical control signals output from the microcomputer 21 are output to the horizontal and vertical signal processor 22. The horizontal and vertical signal processor 22 outputs horizontal and vertical correction signals and horizontal and vertical oscillator signals according to those horizontal and vertical control signals. The horizontal driving circuit 23 receiving the horizontal oscillator signal from the horizontal and vertical signal processor 22, sufficiently amplifies the horizontal oscillation signal, and supplies current to the horizontal deflection yoke circuit 24. The horizontal deflection yoke circuit 24 generates sawtooth wave current and horizontally synchronizes the video signal displayed on the monitor screen with the current.

The fluorescent surface of the monitor is not spherical and therefore the right and left sides are more magnified than the center part, thereby causing a distortion. The S-shaped correction signal for correcting the distortion is output to the S-shaped correcting and switching circuit 25 from the microcomputer 21. The S-shaped correcting and switching circuit 25 supplies a correction waveform to the horizontal deflection yoke circuit 24 and performs the S-shaped correction. The S-shaped correcting and switching circuit 25 turns on/off the switch in the S-shaped correcting and switching circuit 25 to magnify the horizontal size of the certain portion on the monitor screen.

Meanwhile, the vertical deflection IC 26 receiving the vertical oscillation signal output from the horizontal and vertical signal processor 22 supplies sufficient current to the vertical deflection yoke circuit 27. If the current supplied from the vertical deflection IC 26 is sufficient, the vertical deflection yoke circuit 27 outputs the vertical sawtooth wave current to the vertical deflection yoke V-DY to thereby synchronize the video signals on the monitor screen.

Here, if the S-shaped correcting and switching circuit 25 inputs a signal for magnifying the certain portion, namely, the edge or the center of the monitor screen, the horizontal and vertical signal processor 22 receiving the vertical control signal output from the microcomputer 21 with the control program of the monitor screen magnification supplies the vertical control signal to the vertical deflection IC 26 and generates the vertical sawtooth wave current according to the voltage control signals. Moreover, the S-shaped correcting and switching circuit 25 receiving the switching control signal from the microcomputer 21 turns on/off the switch according to the switching control signal. Therefore, the monitor screen is simultaneously magnified horizontally and vertically through the above-mentioned operation.

A preferred embodiment of the invention will be described below.

Figure 6:
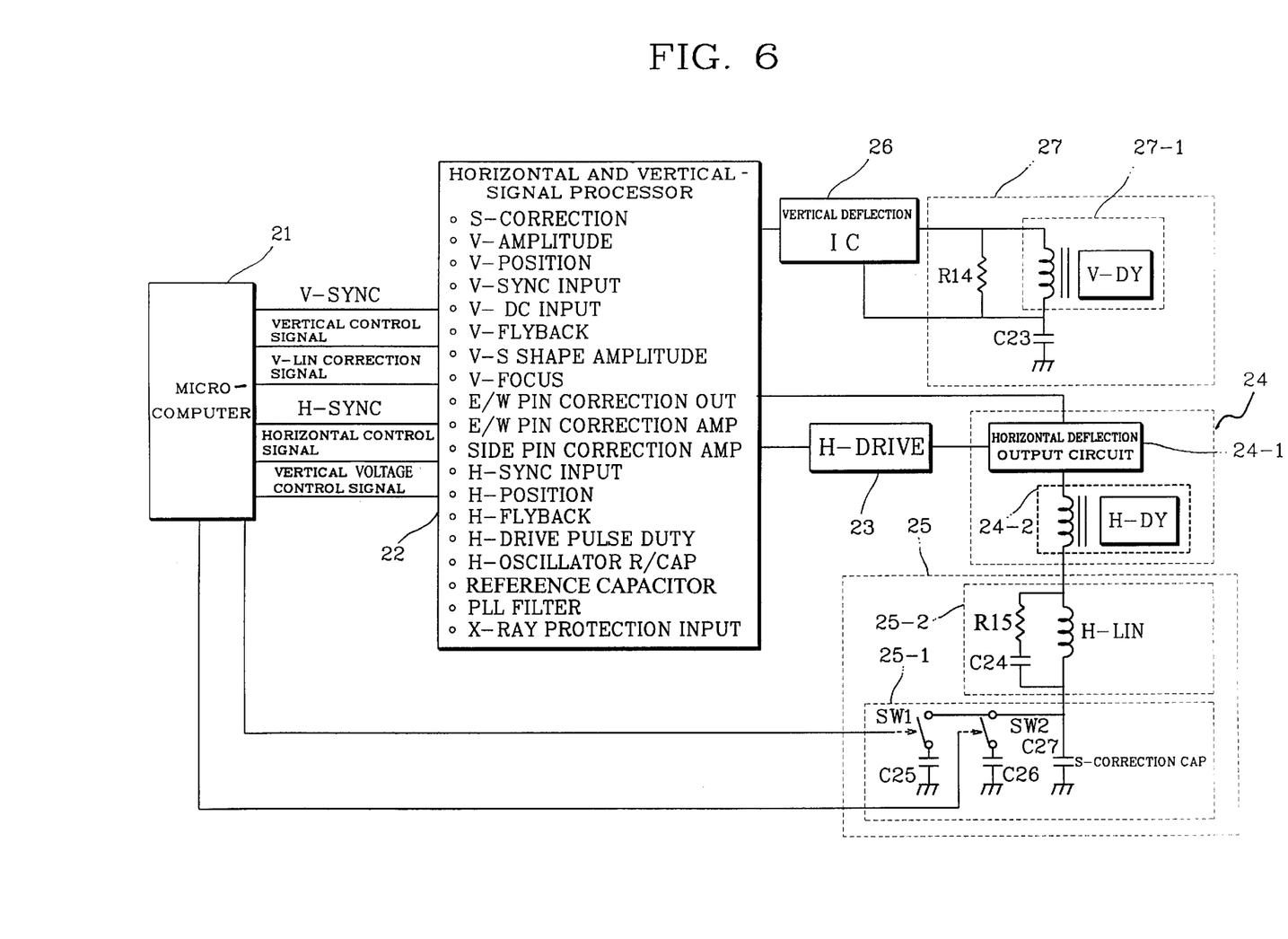
FIG. 6 is a circuit diagram illustrating a preferred embodiment of the monitor screen size controlling circuit of the invention.

As illustrated in FIG. 6, a monitor screen size control circuit includes a microcomputer 21, mounted in the monitor 20, and having a screen size magnification controlling program, which receives horizontal and vertical synchronization signals H-SYNC and V-SYNC from a video card 11 (see FIG. 5) to generate the horizontal and vertical control signals, and generates a switching control signal and a voltage control signal according to the magnification of the monitor screen to magnify the screen size, and thus controlling the generated switching and voltage control signals; a horizontal and vertical signal processor 22 for receiving the horizontal and vertical control signal and the voltage control signal according to the vertical size magnification of the monitor screen each output from the microcomputer 21, and outputting correction signals according to the horizontal and vertical control signal and control voltage according to the voltage control signal for the vertical size magnification of the monitor screen; a horizontal driving circuit 23 for receiving the horizontal correction signal output from the horizontal and vertical signal processor 22 and for supplying sufficient current; a horizontal deflection yoke circuit 24 for receiving the horizontal current signal from the horizontal driving circuit 23, generating a sawtooth wave current and synchronizing the R. G. B. signals on the monitor; an S-shaped correcting and switching circuit 25 for receiving an S-shaped correcting signal and a switching signal according to the horizontal size magnification of the monitor screen each output from the microcomputer 21, controlling the S-shaped distortion according to the S-shaped correction signal and magnifying the horizontal size of the monitor screen according to the switching control signal; a vertical deflection IC 26 for receiving the vertical control signal and the control voltage according to the voltage control signal for the vertical size magnification of the monitor screen, and for generating the sawtooth wave current according to the vertical control signal and the voltage control signal for the vertical size magnification of the monitor screen; and a vertical deflection yoke circuit 27 for receiving the sawtooth wave current output from the vertical deflection IC 26, and synchronizing the R. G. B. video signals.

In the structure, the horizontal deflection yoke circuit 24 includes a horizontal deflection output circuit 24-1 for receiving the current signal from the horizontal driving circuit 23 and for generating the sawtooth wave current; and a horizontal deflection yoke H-DY 24-2 for receiving the sawtooth wave current generated in the horizontal deflection output circuit 24-1 and for synchronizing the video signal displayed on the monitor.

In the S-shaped correcting and switching circuit 25 for controlling the horizontal size of the monitor screen, a switch 25-1 for controlling the horizontal size of the screen includes a first switch SW1 for receiving first and second switch control signals SW1 and SW2 according to the screen size magnification output from the microcomputer 21, and capacitors C25 to C27. A horizontal linearity circuit 25-2 which control the horizontal size of the image displayed on the screen according to the switching signal output from the switch 25-1 includes a horizontal linearity coil H-LIN, a resistor R15 and a capacitor C24.

The vertical deflection yoke 27 for generating the sawtooth wave current with the vertical current signal output from the vertical deflection IC 26 consists of a vertical deflection yoke V-DY 27-1, a resistor R14 and a capacitor C23 to thereby control the vertical size of the image displayed on the screen by receiving the generated sawtooth wave current.

An operation of the thus structured device will be described below.

The microcomputer 21 in the monitor receives the horizontal and vertical synchronization signals H-SYNC and V-SYNC for synchronizing the R. G. B. video signals output from the video card 11 (see FIG. 5), and outputs the horizontal and vertical synchronization signals H-SYNC and V-SYNC and the horizontal and vertical control signals according to the horizontal and vertical control data.

The horizontal and vertical signal processor 22 receives the horizontal and vertical synchronization signals H-SYNC and V-SYNC, and the horizontal and vertical control signals output from the microcomputer 21, and outputs a control signal for the supplied horizontal and vertical control signals and the horizontal and vertical synchronization signals. For example, the horizontal and vertical signal processor controls and outputs an S-shaped correction signal CORRECTION, a vertical amplitude signal V-AMPLITUDE and a vertical position controlling signal V-POSITION for varying the amplitude gain of the vertical sawtooth wave, an input vertical synchronization signal V-SYNC INPUT, a input vertical series current signal V-DC INPUT, a vertical flyback signal V-FLYBACK, an S-shaped amplitude signal V-S SHAPE AMPLITUDE being a variable signal for changing into a vertical S-shaped signal, a pin correction signal output East/West PIN CORRECTION OUT being an east/west pin correction signal of the monitor screen, a pin correction amplitude signal East/West PIN CORRECTION AMP being a gain signal of the east/west pin correction signal of the monitor screen; a side pin correction amplitude signal SIDE PIN CORRECTION AMP, an input horizontal synchronization signal H-SYNC INPUT, a horizontal position control signal H-POSITION, a horizontal flyback signal H-FLYBACK, a duty control signal ofthe horizontal driving pulse H-DRIVE PULSE DUTY, a horizontal oscillator signal for displaying the resistance and capacitor value H-OSCILLATOR R/CAP, a reference capacitor signal REFERENCE CAPACITOR, a phase-locked loop filter signal PLL FILTER, an input X-ray protection input signal X-RAY PROTECTION INPUT for sensing an overvoltage to stop the horizontal oscillator.

The horizontal control signals are output to the horizontal deflection yoke circuit 24 from the horizontal and vertical signal processor 22 and amplified to generate sufficient current. When the sufficient current flows in the horizontal deflection yoke circuit 24, it is supplied to the horizontal output circuit 24-1. If so, the sawtooth wave current flows through the horizontal deflection yoke HDY 24-2 and synchronizes the video signals displayed on the monitor screen.

If a user selects buttons for magnifying a certain portion in the screen (not shown), the signal according to the button selection is supplied to the microcomputer 21. The microcomputer 21 executes a screen size m program, and the microcomputer 21 generates the monitor magnification control data for magnifying the size of the monitor screen. That is, the voltage and switching control signals for the vertical size magnification of the monitor screen are output.

The switching and voltage control signals output from the microcomputer 21 will be described by dividing into the center part and edge part magnifications of the monitor screen. First, if a user selects a button for magnifying the edge of the monitor screen, the microcomputer 21 outputs the first and second switch control signals as a low level signal respectively. The first and second switches SW1 and SW2 in the switching part 25-1 receiving the first and second control signals of low level are all turned off. Through this, the capacitance value of the capacitor connected to the horizontal linearity compensating circuit 25-2 is changed. That is, only the capacitor C27 is connected to the horizontal linearity compensating circuit 25-2 to thereby magnify the horizontal size of the screen.

Moreover, the horizontal and vertical signal processor 22 receiving the voltage control signal for magnifying the edge part of the monitor screen output from the microcomputer 21 supplies the low voltage input to the vertical deflection yoke V-DY 27-1 to generate the sawtooth wave current. By the sawtooth wave current, the size of the vertical screen is magnified. Therefore, the edge of the monitor screen is magnified.

If a user selects the button for magnifying the center of the monitor screen, the microcomputer 21 receiving the signal according to the selection outputs the high voltage and the switching control signal according to the magnification of the center of the monitor screen. That is, it outputs both the first and second switch control signals at the high level to the switch part 25-1. The first and second switches SW1 and SW2 receiving the high level signals are turned on. Therefore, the current flow supplied to the horizontal linearity circuit 25-2 and the horizontal deflection yoke H-DY 24-2 is different from the normal screen by the capacitors C25, C26 and C27. That is, the center part of the monitor screen is partially magnified.

If a button to retrieve to the original normal screen is selected after magnify the edge and center parts of the monitor screen, the microcomputer stops to output the voltage control signal for the magnification. The first switching control signal is output at a low level and the second switching signal is output at a high level. The first switch S1 receiving the switching control signal is turned off, and the second switch SW2 is turned on. Through this step, the screen is returned to the original normal screen in the state that the monitor screen is partially magnified. The resistor R14 is used to protect from the overvoltage. The capacitor C23 is used for smoothing.

Figure 7:
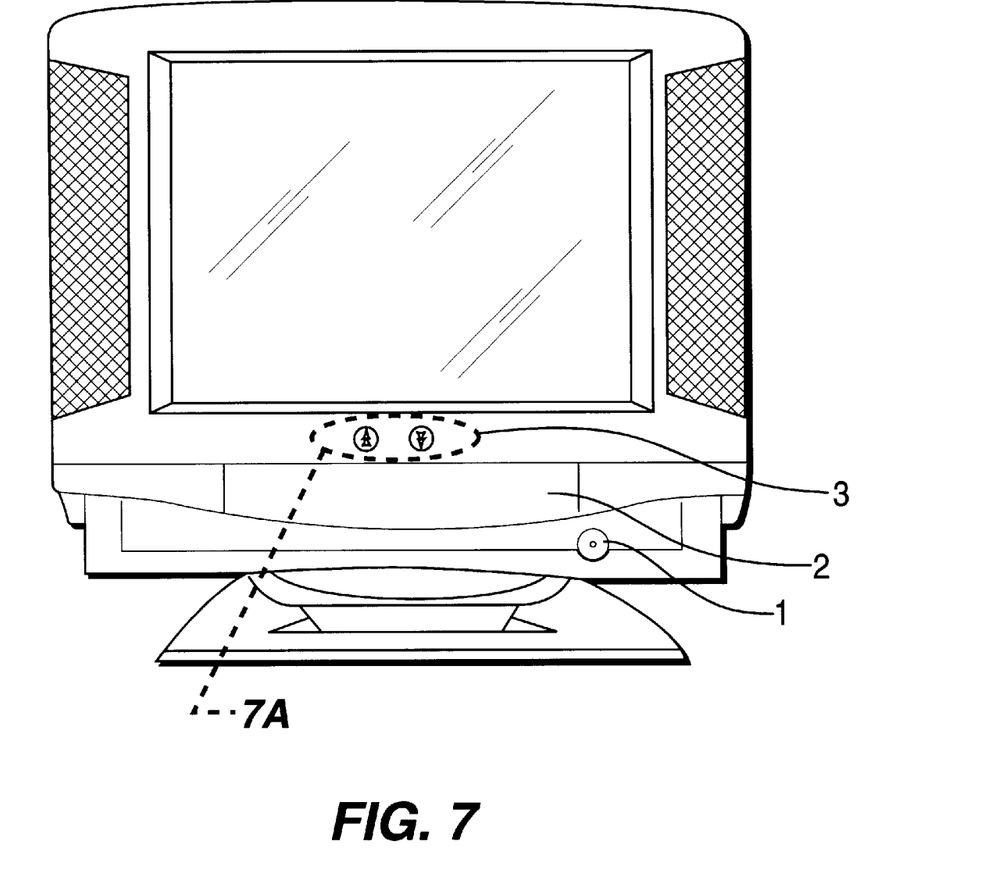
FIG. 7 is a front view of the monitor of the invention.
Figure 7A:
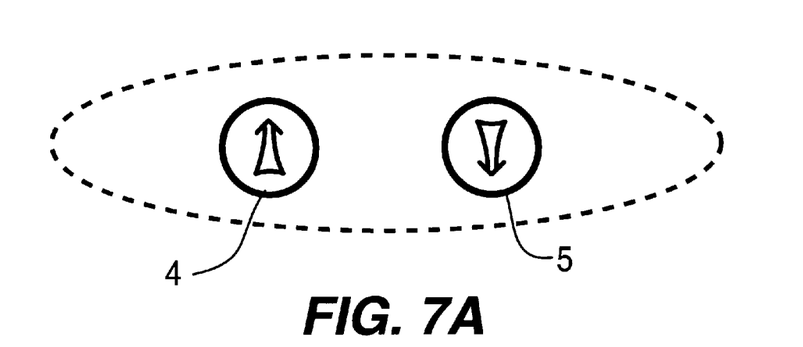

The mounting structure of the switch utilized for controlling the screen size will be described with reference to the attached drawing.

FIG. 7, schematically illustrates the typical appearance of the monitor of the invention, including: a power button 1; a front control panel 2 for controlling various functions such as contrast, brightness, color temperature, and horizontal and vertical positions; and switches 3 for magnifying the monitor screen. The switches 3 include first and second switches SW1 4 and SW2 5 for inputting the turn on/off switching signal.

The results of the invention will be described below with reference to the attached drawing.

Figure 8:
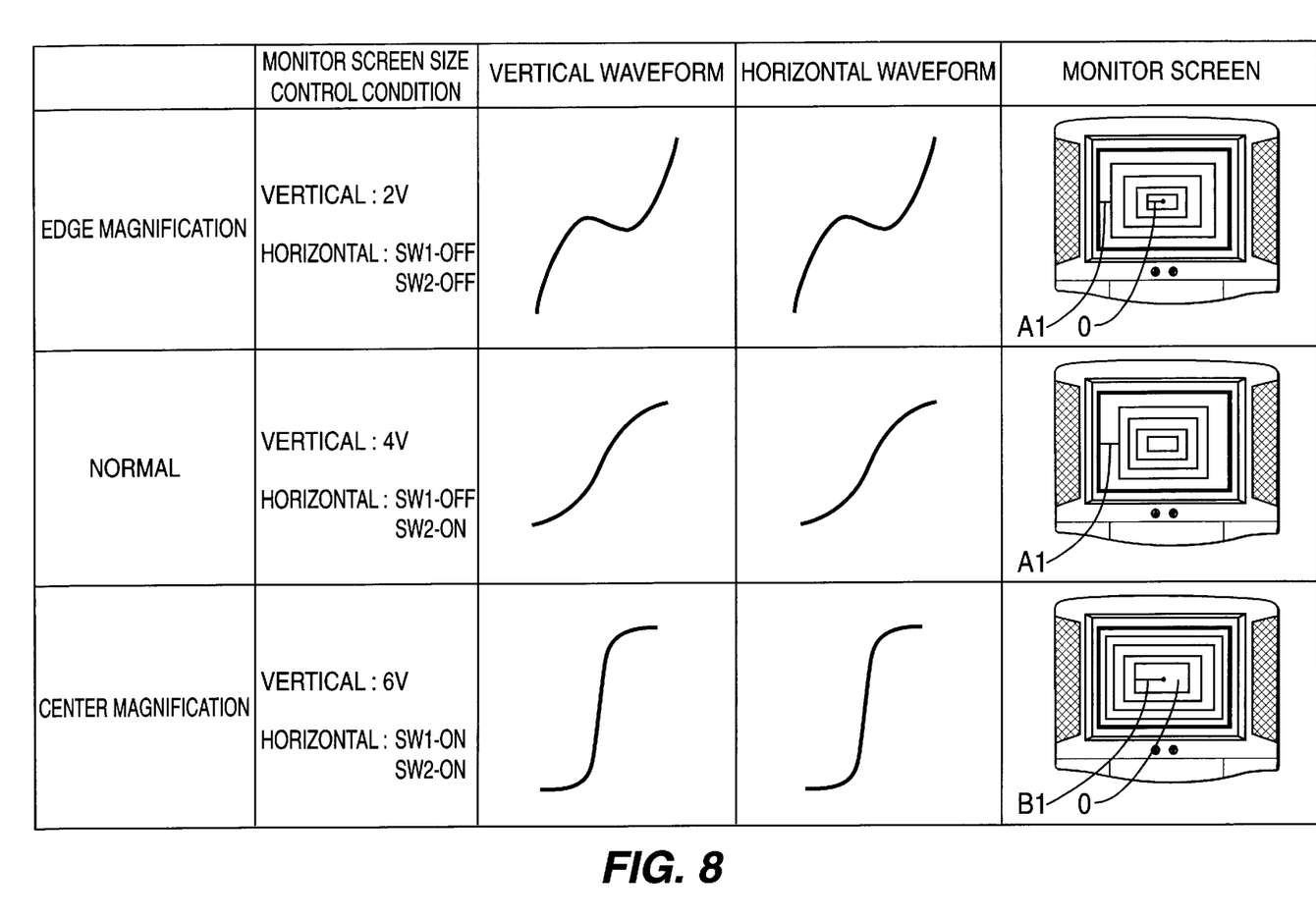
FIG. 8 is a table illustrating the variation in screen size according to the horizontal and vertical current variation of the invention.

As illustrated in FIG. 8, the conditions for controlling the size of the monitor screen is as follows. When the vertical voltage is 4V in the horizontal and vertical signal processor 22 (see FIG. 6), the switch SW1 in the switching part 25-1 is turned off. If the switch SW2 is turned on, the waveforms of the vertical and horizontal outputs are converted into the straight line, so that the monitor screen displays normally. Here, the character "o" on the screen displays the center of the monitor. The character "B" displays the magnified length on the basis of the center of the monitor "o". The character "A" displays the magnified length in the edge. Therefore, with the above-mentioned conditions, the vertical series voltage 2V should be output and both the switches SW1 and SW2 are turned off in order to magnify the edge of the monitor screen. In this case, the vertical and horizontal output waveforms are varied as the gently curved line. Consequently, the edge of the monitor screen is magnified into the length "A1" larger than the normal length "A". On the contrary, to magnifying the center part of the monitor screen with the above conditions, the vertical series voltage of 6V should be output and both the switches SW1 and SW2 are turned on. In this case, the vertical and horizontal output wave forms are varied to have the steeply curved line. Therefore, the center of the monitor is magnified into "B1" larger than the normal length "B".

A method for controlling the size of the monitor screen of the invention will be described below.

Figure 9:
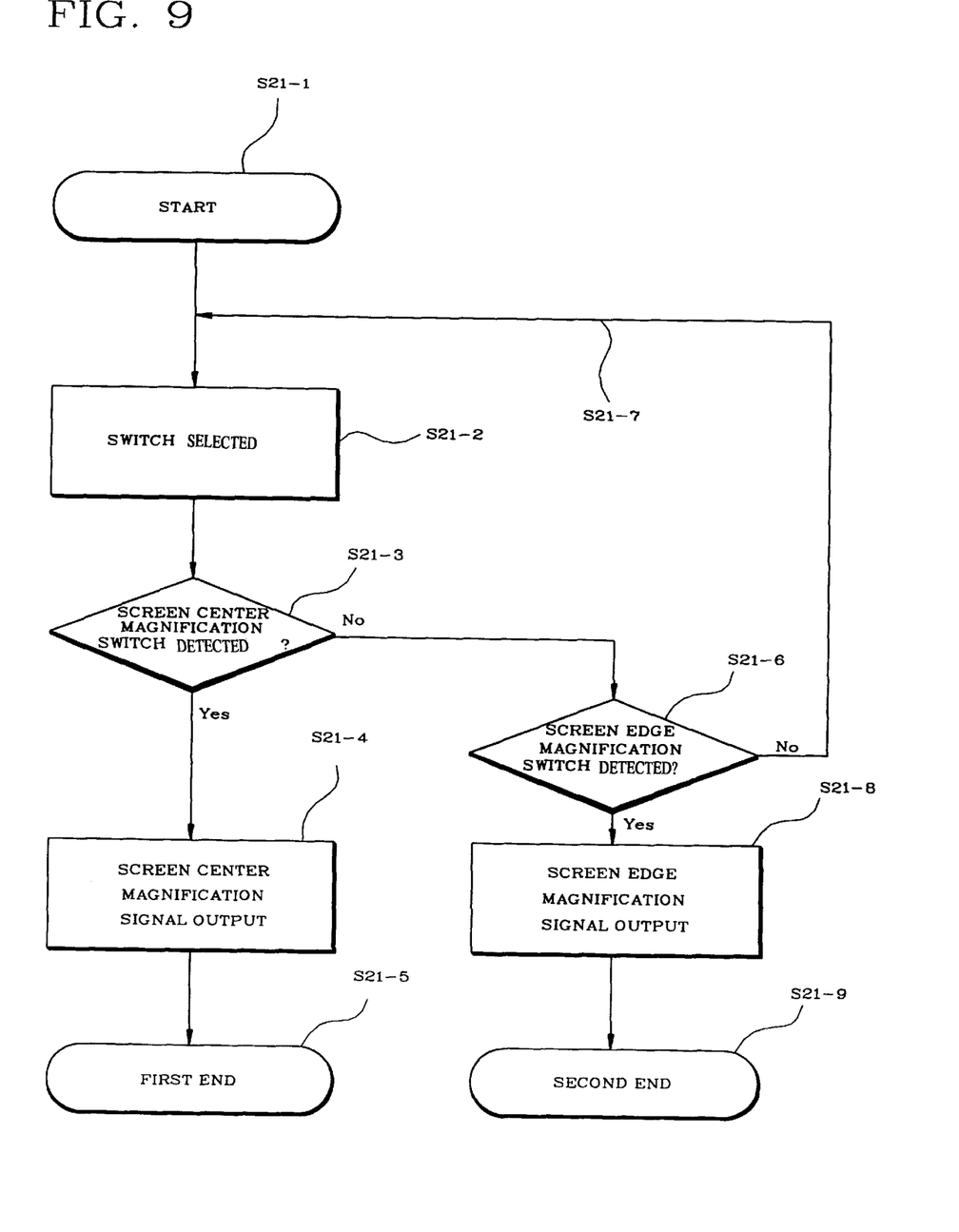
FIG. 9 is a flowchart illustrating the monitor screen size controlling method of the invention.

As illustrated in FIG. 9, the invention includes the steps of: starting to partially magnify the size of the monitor screen for magnifying the certain part during the ON operation of the monitor in step S21-1; selecting a switch for partially magnifying the size of the monitor screen in the step S21-2; selecting the switch for partially magnifying the monitor screen by a user, detecting and determining whether the switch signal with respect to the switch selected in the previous step is the center part magnifying switch in step S21-3; outputting a signal for magnifying the center of the screen in step S21-4 if the switch signal of the previous step is for the center part; ending the output of the center part magnifying signal in step S21-5 if the previous step is completed; detecting and determining whether the switch detected in step S21-3 is for magnifying the center of the monitor, and then, if it is not, detecting whether the switch is for magnifying the edge part of the screen, in step S21-6; returning to the step S21-2 for selecting the switch for partially magnifying the size of the monitor in step S21-7 if the switch detected in the previous step is not the one for magnifying the edge of the screen; outputting the signal for magnifying the edge part of the screen in step S21-8 if the switch is detected to be the right switch for magnifying the edge of the screen in the above step S21-6; and ending outputting the edge magnifying signal in step S21-9 if the above step S21-8 is completed.

Through the step S21-1, there is provided a preparation for magnifying the size of the monitor by partially magnifying a certain portion of the monitor screen during the operation of the monitor. If the step S21-1 is completed, the user selects a switch with respect to the magnification intended area in step S21-2 to partially magnify the size of the monitor screen. The user selects the switch for magnifying the center part in step S21-2 and determines if it is the right switch for magnifying the center part of the monitor screen in step S21-3. Here, if it is determined to be the right switch for magnifying the center part in step S21-3, a step for outputting a screen center part signal is performed in step S21-4. Thereafter, the edge of the monitor screen is magnified and output. Then, if the monitor screen is intended to return to the original screen, the normal screen selecting switch is selected in step S21-5 for ending outputting the signal for magnifying the center part of the monitor screen, so that the images on the screen are returned to the original state.

Meanwhile, if the step S21-6 is executed, the edge of the screen is magnified. In the step S21-6, if the switch is not for magnifying the edge of the screen, the switch is re-selected by returning to the switch selecting step S21-2 in the step S21-7. If the switch is detected to be the right switch for magnifying the edge ofthe screen in step S21-6, there is executed the step S21-8 for outputting the edge magnifying signal for partially magnifying the edge part of the monitor screen. Therefore, the step S21-8 is executed, the edge part of the image displayed on the screen is magnified and output.

By selecting the normal screen selecting switch in the second ending step S21-9 for ending outputting the signal for magnifying the edge of the screen to return the monitor screen into the original screen after magnifying the edge of the image on the screen, the image of the monitor screen is returned to the normal state. Through these steps, the center part of the screen in the video signals displayed on the screen is magnified and output.

As described above, the invention has an effect that a certain part in the full screen of the monitor is magnified by using the S-shaped correcting and switching circuit and the vertical deflection IC.

It will be apparent to those skilled in the art that various modifications and variations can be made in a circuit for and a method of controlling a partial magnification of the monitor screen of the present invention without departing from the spirit or scope of the invention. Thus, it is intended that the present invention cover the modifications and variations of this invention provided they come within the scope of the appended claims and their equivalents.

What is claimed is:

1. A circuit for controlling a partial magnification of a monitor screen, comprising:

a microcomputer mounted in a monitor, said microcomputer containing a magnification control program for controlling the magnification of the monitor screen, said microcomputer receiving horizontal and vertical synchronization signals and generating horizontal and vertical control signals in response to said horizontal and vertical synchronization signals;

a horizontal and vertical signal processor for receiving said horizontal and vertical control signals and a vertical voltage control signal from said microcomputer and outputting horizontal and vertical correction signals and horizontal and vertical oscillator signals according to those horizontal and vertical control signals;

a horizontal driving circuit for supplying a horizontal current to a horizontal deflection yoke circuit in response to said horizontal oscillator signal, said horizontal deflection yoke and generating a horizontal sawtooth wave current for horizontally synchronizing video signals displayed on the monitor screen in response to said horizontal correction signal and said horizontal current;

an S-shaped correcting and switching circuit receiving an S-shaped correcting signal from the microcomputer generating a correction waveform for output to said horizontal deflection yoke for S-shaped correction, and said S-shared correcting and switching circuit receiving a switching control signal output from the microcomputer for controlling an on/off switch to control the horizontal size of a portion of the screen; and a vertical deflection circuit for receiving the vertical correction signal and the vertical oscillator signal output from the horizontal and vertical signal processor according to the vertical voltage control signal for magnifying the vertical size of the monitor screen, and for transferring a vertical sawtooth wave current to a vertical deflection yoke circuit.

2. The circuit as claimed in claim 1, said on/off switch of the S-shaped correcting and switching circuit comprising at least two switches having corresponding capacitors connected thereto, said switches being controlled for selectively connecting an S-shaped correction capacitor in parallel with one or more of said capacitors connected to said switches for controlling which portion of said screen is to be magnified.

3. A method of controlling a partial magnification of a monitor screen, comprising the steps of:

selecting a switch for partially magnifying the size of the monitor screen;

selecting the switch for partially magnifying the monitor screen by a user, detecting and determining whether a switch signal output is a center part magnifying switch signal;

outputting a signal for magnifying the center of the screen if the switch signal is determined to be the center part magnifying switch signal in the previous step;

detecting and determining whether the switch signal detected in the previous step is the center magnifying signal, and detecting whether the switch signal is for magnifying the edge of the screen; and outputting the signal for magnifying the edge of the screen if the switch signal is detected to be the switch signal for magnifying the edge of the screen in the previous step.

4. The method as claimed in claim 3, the step of outputting a signal for magnifying the center part of the monitor screen further comprising a first ending step for ending outputting the signal for magnifying the center part of the monitor screen.

5. The method as claimed in claim 3, the step of outputting a signal for magnifying the edge part of the monitor screen further comprising a first ending step for ending outputting the signal for magnifying the edge part of the monitor screen to return the monitor screen into an original state after the edge of the image is magnified and output on the screen.

6. The method as claimed in claim 3, the step of detecting and determining whether the switch is for magnifying the edge of the screen, further comprising returning to the switch selecting step in which the switch is selected to magnifying the size of the monitor screen when the switch is not for magnifying the edge of the screen.

7. The method as claimed in claim 4, the step of outputting a signal for magnifying the edge part of the monitor screen further comprising a first ending step for ending outputting the signal for magnifying the edge part of the monitor screen to return the monitor screen into an original state.

8. The method as claimed in claim 6, the step of outputting a signal for magnifying the edge part of the monitor screen further comprising a first ending step for ending outputting the signal for magnifying the edge part of the monitor screen to return the monitor screen into an original state.

* * * * *